US012345600B2

(12) United States Patent
Klink et al.

(10) Patent No.: US 12,345,600 B2
(45) Date of Patent: Jul. 1, 2025

(54) METHOD FOR SELF-BALANCING OF A LAMBDA SENSOR AND EXHAUST GAS SYSTEM

(71) Applicant: Dr. Ing. h.c. F. Porsche Aktiengesellschaft, Stuttgart (DE)

(72) Inventors: Yannik Klink, Bietigheim-Bissingen (DE); Tobias Moellenhoff, Stuttgart (DE); Tobias Weissmann, Pohlheim (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 188 days.

(21) Appl. No.: 18/202,448

(22) Filed: May 26, 2023

(65) Prior Publication Data

US 2023/0400385 A1 Dec. 14, 2023

(30) Foreign Application Priority Data

Jun. 13, 2022 (DE) ...................... 10 2022 114 808.4

(51) Int. Cl.
*G01M 15/10* (2006.01)
*F01N 11/00* (2006.01)

(52) U.S. Cl.
CPC ......... *G01M 15/104* (2013.01); *F01N 11/007* (2013.01); *F01N 2550/02* (2013.01)

(58) Field of Classification Search
CPC .... F01N 11/00; F01N 11/007; F01N 2550/02; F01N 2560/025; F01N 2900/0416; F02D 41/149; F02D 41/1494; F02D 41/1495; G01M 15/104

See application file for complete search history.

(56) References Cited

U.S. PATENT DOCUMENTS 4,658,790 A * 4/1987 Kitahara ............ G01N 27/4065
123/693

FOREIGN PATENT DOCUMENTS

DE 102019215819 4/2021

OTHER PUBLICATIONS

German Search Report dated Jan. 19, 2023.

* cited by examiner

*Primary Examiner* — Anthony Ayala Delgado
(74) *Attorney, Agent, or Firm* — Gerald E. Hespos; Michael J Porco

(57) ABSTRACT

A method for self-balancing of a lambda sensor (18, 20, 26) is provided. The method measures pumping current (Ip) and pumping voltage (Up) of the lambda sensor (18, 20, 26), and checks whether the measured pumping current (Ip) and the measured pumping voltage (Up) lie within a specified tolerance range (33). If values lie outside the tolerance range (33) of the characteristic curve specification, an adjustment of the lambda value ($\lambda$) occurs with the aid of the pumping voltage (Up) of the lambda sensor (18, 20, 26), and, in a substantially adjusted state, a further pumping current (Ip) of the lambda sensor (18, 20, 26) is measured and the pumping current offset (32) is derived from the further pumping current (Up). Thus, precise self-balancing of the lambda sensor (18, 20, 26) is carried out, thereby enabling a good exhaust gas after-treatment.

9 Claims, 2 Drawing Sheets

METHOD FOR SELF-BALANCING OF A LAMBDA SENSOR AND EXHAUST GAS SYSTEM

CROSS REFERENCE TO RELATED APPLICATION

This application claims priority on German Patent Application No 10 2022 114 808.4 filed Jun. 13, 2022, the entire disclosure of which is incorporated herein by reference.

BACKGROUND

Field of the Invention

The invention relates to a method for self-balancing of a lambda sensor for an exhaust gas system of a motor vehicle propelled by an internal combustion engine so that an exhaust gas after-treatment is optimum. The invention also relates to an exhaust gas system configured for this purpose.

Related Art

DE 10 2019 215 819 A1 relates to self-adjustment of a lambda sensor where pairs of values measure a pumping current and a pumping voltage of the lambda sensor. A regression curve then is developed with the aid of the pairs of values. In the event that the regression curve is not within a tolerance range defined by threshold values specified for the pumping current, a pumping current offset for the self-balancing is calculated so that the compensation curve is again within the tolerance range.

There is a continuing need to improve exhaust gas after-treatment in a motor vehicle propelled by an internal combustion engine.

The problem addressed by the invention is to demonstrate measures that enable a good exhaust gas after-treatment in a motor vehicle propelled by an internal combustion engine.

SUMMARY OF THE INVENTION

One aspect of the invention relates to a method for self-balancing or self-adjustment of a lambda sensor for an exhaust gas system of a motor vehicle that is propelled by an internal combustion engine. The method includes measuring pumping current of the lambda sensor provided for detecting a lambda value, and measuring a pumping voltage of the lambda sensor correlating to the pumping current. The method then includes checking whether a pair of values composed of the measured pumping current and the measured pumping voltage lies within a specified tolerance range of a characteristic curve specification for a dependence between the pumping current and the pumping voltage. In the event that the values lie outside the tolerance range of the characteristic curve specification, then the method includes adjusting the lambda value with the aid of the pumping voltage of the lambda sensor rather than the pumping current of the lambda sensor. In a substantially adjusted state, the method proceeds by determining a further pumping current of the lambda sensor calculated from the pump voltage and, for the self-balancing of the lambda sensor, the pumping current offset is derived from the further pumping current for a compensation of a leakage current and/or a fault current of the lambda sensor and/or a cable harness belonging to the lambda sensor.

In the case of a broadband lambda sensor, it is generally possible that conduction damage can occur in the lambda sensor and/or in the cable harness belonging to the lambda sensor during operation. This conduction damage can lead to a leakage current and/or a fault current. In the case of a lambda adjustment for the internal combustion engine based on the pumping current of the lambda sensor, a lambda value $\lambda=1.0$ for the combustion air ratio (ratio of supplied combustion air to combustion air required for stoichiometric combustion) at a pumping current $I_p=0.0$ mA is assumed, the lambda sensor would have an erroneous, too rich lambda value, that would result in leaner than actually intended operation of the internal combustion engine and thus a higher amount of combustion pollutants following an engagement of the adjustment intervention based on the measured value of this lambda sensor. The leakage current results in a pumping current offset at a defined measuring point, in particular at a pumping voltage $U_p=0$ mV, which can be adapted and considered by a correction of the measured pumping current referred to as "self-adjustment."

However, it has been found that different mixture influences can be present within the exhaust gas system, and combustion air ratios that deviate from a lambda value $\lambda=1.0$ can be set deliberately by adjustment interventions, for example, in a bank equalization in which the combustion air ratios of different motor banks are adjusted such that a mixture of the respective combustion products of the motor banks satisfies a desired lambda value, in particular of $\lambda=1.0$. This results in the lambda sensor intentionally operating in an operating range significantly distanced from the pumping voltage $U_p=0$ mV, in which a function $U_p=f(I_p)$ is not steep but flat. In this rather flat range of the substantially S-shaped characteristic curve of the $U_p$ to $I_p$ relationship, the pumping current offset to be determined varies greatly as a function of the pumping voltage subject to fluctuations and/or the pumping current subject to fluctuations. The pumping current offset required for self-adjustment is therefore only to be determined very inaccurately in such situations, and would lead to an insufficient self-alignment and an impaired exhaust gas after-treatment.

If a leakage current and/or a fault current caused by conduction damage occurs in the method, in the event that the pair of values from the pumping current and the pumping voltage lies outside the tolerance range of the associated characteristic curve, in particular in the manner of $U_p=f(I_p)$, the pumping current offset is not immediately measured. Instead, the lambda value is first determined partially on the basis of the pumping voltage, deviating from a measurement that is otherwise based on the pumping current. With the aid of the lambda value determined based on the pumping voltage, the lambda adjustment provided with the aid of the lambda sensor is continued. The further pumping current is calculated from the measured pumping voltage only when a sufficiently adjusted or balanced state is achieved, which preferably corresponds to the state $\lambda=1.0$. In the measuring point corresponding to $\lambda=1.0$, $I_p=0.0$ mA should be true for the pumping current, so that the pumping current offset can be read directly from the further pumping current. In a different measuring point of $\lambda=1.0$ in the adjusted or balanced state, the pumping current offset can be determined from a difference of the further pumping current to a value of a characteristic $\lambda=f(I_p)$ deposited for this measuring point with the determination of the lambda value as $\lambda=f(U_p)$. Instead of determining the pumping current offset immediately upon suspicion of a fault, an adjusted state for the lambda value is activated based on the pumping voltage, before the pumping current offset is determined. Thus, a faulty determination of the pumping current offset in an unfavorable operating point of the lambda sensor is avoided safely, and a good exhaust gas after-treatment in a motor vehicle propelled by an internal combustion engine is enabled by the self-balancing of the lambda sensor, which is carried out more precisely as a result.

Points outside the tolerance range bounded by tolerance curves arise due to shifted sensor characteristic curves and can be described as implausible. This also functions for points above a maximum provided pumping voltage $U_{p,Max}$ and below a minimum provided pumping voltage $U_{p,Min}$, which thus lie outside a switch-on range of the actual self-alignment. If these values are undershot or overshot, the tolerances increase sharply so that a fault-free adaptation is not possible. However, it can be clearly discerned that there is an offset for the pumping current. The quantification of this offset, and thus the decision as to whether the offset is to be adapted or diagnosed as a fault and output, can be determined downstream by the function of self-balancing. In addition, there is a robust method for debouncing the suspicion of a fault so as not to interpret scatters of the $U_p/I_p$ measured values incorrectly as an offset due to dynamics or similar influences. Thus, it is possible to distinguish a faulty offset from a normal scattering of measured values that vary to some extent by the reference characteristic curve.

After the self-adjustment of the lambda sensor, the pumping current of the lambda sensor corrected by the pumping current offset is used instead of the pumping voltage of the lambda sensor to detect a lambda value. Thus, the determination of the lambda value as a function of the pumping voltage is carried out only in the time window from the determination of a suspicion of a fault up to the subsequent self-balancing. The pumping voltage therefore is used only for as long as the value of the measured pumping current appears implausible. In regular operation, the lambda value can be measured simply and accurately as a function of the pumping current of the lambda sensor.

The lambda sensor may be a broadband lambda sensor. The lambda sensor can thereby measure a plurality of lambda values compared to a switching-type sensor, so that many different measuring points of an operating point of the lambda sensor can be present, such as operating points in which an immediate measurement of a pumping current offset would be inaccurate upon a suspicion of failure. Thus, the method can provide a better and more accurate result.

A further aspect of the invention relates to an exhaust gas system for a motor vehicle propelled by an internal combustion engine. The exhaust gas system has a first lambda sensor for detecting a first lambda value of a first motor bank of an internal combustion engine, a second lambda sensor for detecting a second lambda value of a second motor bank of the internal combustion engine, and a motor bank control system to adjust the first motor bank and the second motor bank so that a substantially equal lambda value is achieved for the first motor bank and for the second motor bank. The first lambda sensor comprises a first self-adjuster set up to carry out the method, and can be developed or expanded as described. The second lambda sensor comprises a second self-adjuster set up to carry out the method and can be developed or expanded as described.

The first and second lambda sensors can cause a bank equalization, in which combustion air ratios of the different motor banks is adjusted so that a mixture of the combustion products of the respectively associated motor banks satisfies a desired lambda value, in particular $\lambda=1.0$, to compensate for a deliberately too lean combustion with a deliberately too rich combustion and/or to set the same lambda value for all motor banks, which is especially suitable for a particular driving situation. The first lambda sensor and the second lambda sensor therefore can be operated intentionally at an operating point where an instant measurement of a pumping current offset would be inaccurate upon suspicion of failure, and the self-adjuster can provide a better and more accurate result. Instead of determining the pumping current offset immediately upon suspicion of a fault, a balanced state for the lambda value initially is activated based on the pumping voltage, before the pumping current offset is determined. Thus, a faulty determination of the pumping current offset in an unfavorable operating point of the lambda sensor is safely avoided and a good exhaust gas after-treatment is enabled by the self-balancing of the lambda sensor, which is carried out more precisely as a result.

An exhaust gas catalyst can be provided downstream of the first lambda sensor and the second lambda sensor for chemically converting combustion pollutants, and a catalyst lambda sensor configured as a switching-type sensor can be provided on the output side of the exhaust gas catalyst. Proper operation of the exhaust gas catalyst can be monitored by comparing the lambda value immediately before and immediately after the exhaust gas catalyst. Such monitoring can determine an unfavorable operation of the exhaust gas catalyst that leads to insufficient exhaust gas after-treatment. This determination could trigger an adjustment intervention that affects the lambda value for combustion in the internal combustion engine. This control intervention can be monitored and/or adjusted by the first and second lambda sensors.

The catalyst lambda sensor may be connected via an adjustment device to the first lambda sensor and/or the second lambda sensor for self-balancing of the first lambda sensor and/or the second lambda sensor as a function of a lambda adjustment intervention determined with the aid of the catalyst lambda sensor. A plausibility test of the lambda value determined by the first lambda sensor and/or the second lambda sensor can be carried out using the catalyst lambda sensor. The catalyst lambda sensor can trigger a suspicion of failure in the first lambda sensor and/or from the second lambda sensor and can trigger a self-balancing based on the method described above.

A pre-catalyst lambda sensor, in particular a broadband lambda sensor, can be provided on the input side of the exhaust gas catalyst. The catalyst lambda sensor can be connected via an adjustment device to the pre-catalyst lambda sensor to enable self-alignment of the pre-catalyst lambda sensor as a function of a lambda adjustment intervention determined with the aid of the catalyst lambda sensor. In particular, the catalyst lambda sensor can cause a suspicion of failure in the pre-catalyst lambda sensor and can cause a self-balancing based on the method described above.

The pre-catalyst lambda sensor of some embodiments comprises a third self-adjuster set up to carry out the method that can be developed or expanded as described. A pumping current of the catalyst lambda sensor can be measured to derive a pumping current offset for the catalyst lambda sensor therefrom. Additionally or alternatively, a pumping current of the pre-catalyst lambda sensor can be measured to derive a pumping current offset for the pre-catalyst lambda sensor therefrom.

A further aspect of the invention relates to an exhaust gas system for a motor vehicle propelled by an internal combustion engine. The system has an exhaust gas catalyst for chemically converting combustion pollutants of the internal combustion engine, a pre-catalyst lambda sensor on the input side of the exhaust gas catalyst and in particular configured as a broadband lambda sensor, and a catalyst lambda sensor on the output side of the exhaust gas catalyst. The pre-catalyst lambda sensor comprises a third self-adjuster set up to carry out an embodiment of the method.

A pumping current of the catalyst lambda sensor can be measured to derive a pumping current offset for the catalyst lambda sensor. Additionally, or alternatively, a pumping current of the pre-catalyst lambda sensor can be measured to derive a pumping current offset for the pre-catalyst lambda sensor. Instead of determining the pumping current offset immediately upon suspicion of a fault, an adjusted state for the lambda value initially is activated based on the pumping voltage, before the pumping current offset is determined. Thus, a faulty determination of the pumping current offset in an unfavorable operating point of the catalyst lambda sensor or the pre-catalyst lambda sensor is avoided and a good exhaust gas after-treatment in a motor vehicle propelled by an internal combustion engine is enabled by the self-balancing of the catalyst lambda sensor or the pre-catalyst lambda sensor, which is carried out more precisely as a result.

The invention is explained by way of example below with reference to the accompanying drawings. The features presented below can represent an aspect of the invention both individually and in combination.

DETAILED DESCRIPTION

Figure 1:
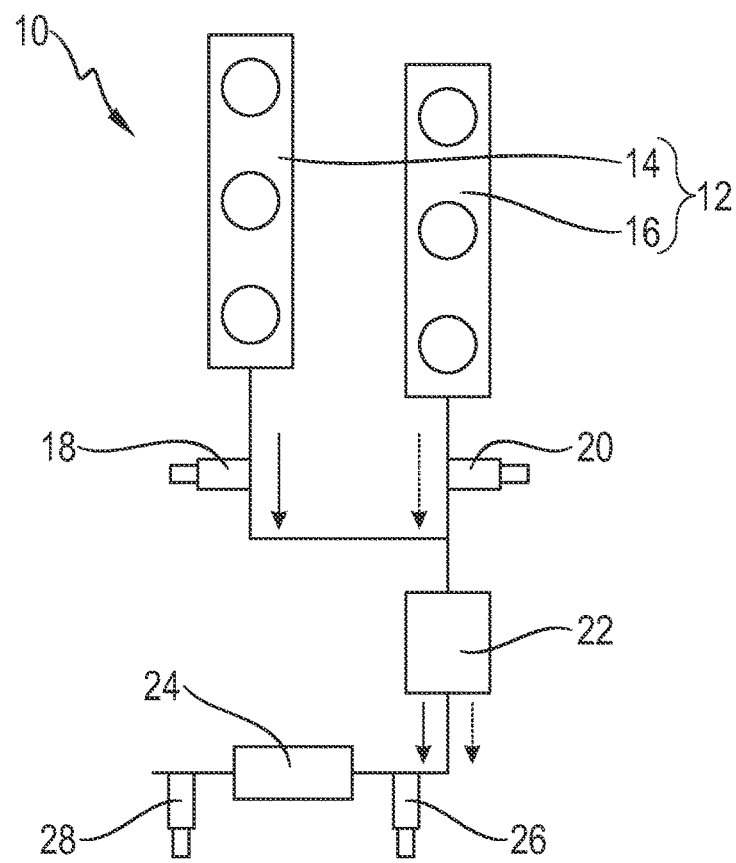
FIG. 1 a schematic principle diagram of an exhaust gas system.

The exhaust gas system 10 shown in FIG. 1 can be provided in a motor vehicle propelled by an internal combustion engine. The motor vehicle can comprise an internal combustion engine 12 having, in the illustrated example, a first motor bank 14 and a second motor bank 16, each of which can operate separately at a particular lambda value. Downstream of the internal combustion engine 12 there can be provided a first lambda sensor 18 that is configured as a broadband lambda sensor to measure the lambda value of the first motor bank 14, and a second lambda sensor 20 that is configured as a broadband lambda sensor to measure the lambda value of the second motor bank 14. The first and second lambda sensors 18 and 20 can be used for a bank equalization in which the combustion air ratios of the first motor bank 14 and the second motor bank 16 are adjusted so that a mixture of the combustion products of the motor banks 14, 16 satisfy a desired lambda value, in particular λ=1.0, to set for all motor banks 14, 16 the same lambda value that is suitable for a particular driving situation.

The exhaust gas coming from the motor banks 14, 16 can be fed to an exhaust turbine 22 of an exhaust turbocharger after merging downstream of the first and second lambda sensors 18 and 20. The exhaust gas can be supplied from exhaust turbine 22 to an exhaust gas catalyst 24 to chemically convert combustion pollutants. For this purpose, a pre-catalyst lambda sensor 26, which is configured as a broadband lambda sensor, can be provided on the input side of the exhaust gas catalyst 24, and a catalyst converter lambda sensor 28, which is configured as a switching-type sensor, can be provided on the output side of the exhaust gas catalyst 24.

Figure 2:
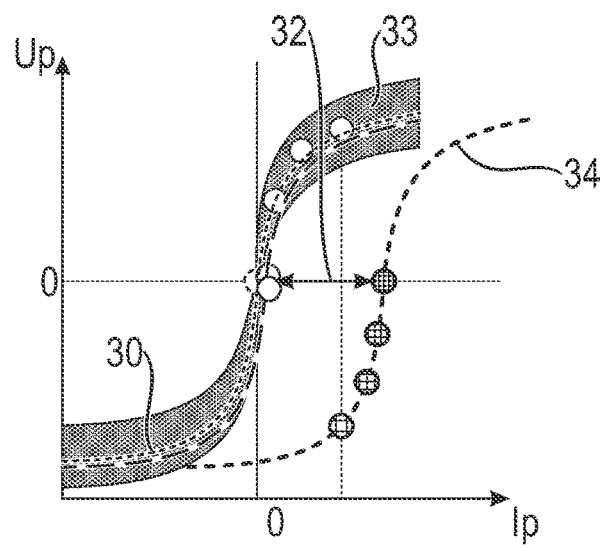
FIG. 2 a schematic diagram of pumping voltage/pumping current characteristic curves of a lambda sensor.

As shown in FIG. 2, in a properly functioning lambda sensor at a lambda value λ=1.0 for the combustion air ratio, there is a pumping current $I_p$ of approximately 0.0 mA at a pumping voltage $U_p$ of approximately 0 mV. The dependence $U_p=f(I_p)$ results in a substantially S-shaped characteristic curve 30 that has a steep curve in a region around the pumping current $I_p=0.0$ mA and a flat curve outside this region. If conduction damage occurs that can lead to a leakage current and/or a fault current, there is a pumping current $I_p$ for the lambda value λ=1.0 and the associated pumping voltage $U_p=0$ mV that is different than $I_p=0.0$ mA. This results in a faulty characteristic curve 34 that is offset from the characteristic curve 30 by a pumping current offset 32 from a tolerance range 33 specified around the characteristic curve 30.

Figure 3:
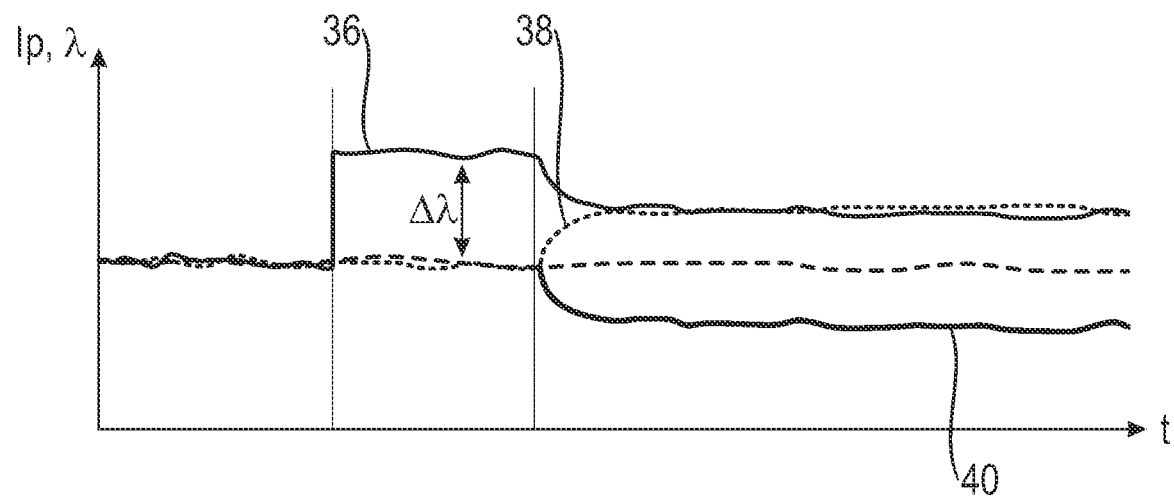
FIG. 3 a schematic diagram of a temporal curve of lambda values.

For example, as shown in FIG. 3, when a lambda value is determined on first lambda sensor 18 using the faulty characteristic curve 34, a switch by Δλ results in a first lambda value curve 36 measured by the first lambda sensor 18. The bank equalization then adjusts the fuel supply and the fresh air supply for the first motor bank 14 and the second motor bank 16 such that both the first lambda value flow sensor 18 and the second lambda sensor 20 deliver the same pumping current $I_p$ and thus the supposedly same lambda value, resulting in the equally measured pumping currents $I_p$ for the first lambda value curve 36 and a second lambda value curve 38 measured by the second lambda sensor 20. However, due to the defect of the first lambda sensor 18, an actual first lambda value curve 40 is significantly lower and lies in the richer range.

Figure 4:
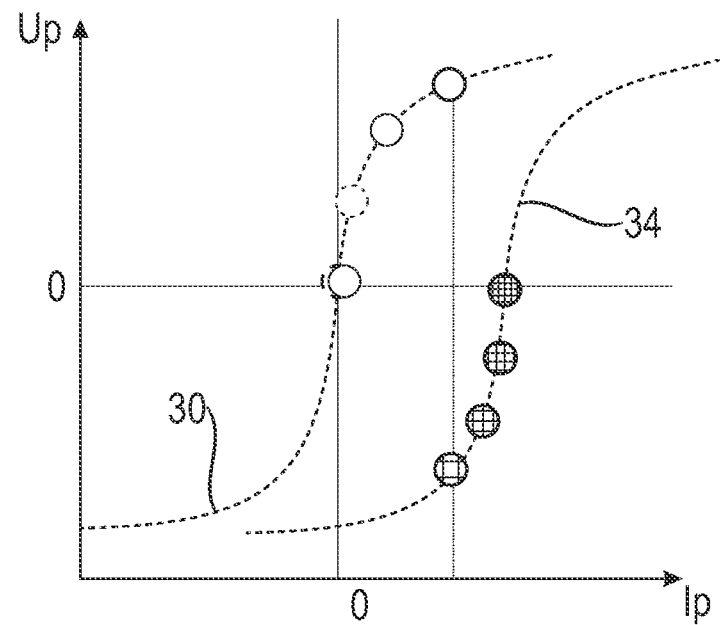
FIG. 4 a schematic diagram of pumping voltage/pumping current characteristic curves of different lambda sensors in a bank equalization.

As shown in FIG. 4, the adjustment of the pumping currents $I_p$ of the first lambda sensor 18 and the second lambda sensor 20 caused by the bank equalization causes the operating points of the first lambda sensor 18 and the second lambda sensor 20 to shift into the flat regions of the characteristic curve 30 associated with the second lambda value curve 38 and the faulty characteristic curve 34 associated with the first lambda value curve 36. Due to the strong dependence of the pumping current $I_p$ on the pumping voltage $U_p$ in the flat regions, variations in the pumping voltage $U_p$ within a scattering range already lead to significant variations in the pumping current $I_p$, so that a pumping current offset 32 can be determined only very inaccurately.

Therefore, in this situation, it is provided that the lambda value Δ is determined as a function of the pumping voltage $U_p$ for the self-alignment of the first lambda sensor 18, an adjusted state that corresponds to a lambda value of λ=1.0 and a pumping voltage $U_p=0$ mV is awaited, and the pumping current offset 32 is only determined in the adjusted state. In this state, the operating points of the lambda sensors 18, 20 are in the steep region of the characteristics 30, 34 so that the pumping current offset 32 can be determined with a higher accuracy. With the aid of the pumping current offset 32 determined in this way, the self-adjustment or self-balancing of the first lambda sensor 18 can be carried out and the lambda value Δ can subsequently be determined again without offset as a function of the pumping current $I_p$ of the first lambda sensor 18. This procedure in carrying out the self-adjustment or self-balancing can also be provided for the second lambda sensor 20 and/or the pre-catalyst lambda sensor 26.

The invention claimed is:

1. A method for self-alignment of a lambda sensor (18, 20, 26) for an exhaust gas system (10) of a motor vehicle propelled by an internal combustion engine, comprising:
   measuring a pumping current ($I_p$) of the lambda sensor (18, 20, 26) provided for detecting a lambda value ($\Delta$);
   measuring a pumping voltage ($U_p$) of the lambda sensor (18, 20, 26) correlating to the pumping current ($I_p$);
   checking whether the measured pumping current ($I_p$) and the measured pumping voltage ($U_p$) lie within a specified tolerance range (33) of a characteristic curve specification for a dependence between the pumping current ($I_p$) and the pumping voltage ($U_p$); and
   when the values lie outside the tolerance range (33) of the characteristic curve specification, then adjusting the lambda value ($\lambda$) based on the pumping voltage ($U_p$) of the lambda sensor (18, 20, 26) rather than based on the pumping current ($I_p$) of the lambda sensor (18, 20, 26), and, in an adjusted state, measuring a further pumping current ($I_p$) of the lambda sensor (18, 20, 26) and, for self-alignment of the lambda sensor (18, 20, 26), deriving a pumping current offset (32) from at least one of:
   a further pumping current ($U_p$) for a compensation of a leakage current,
   a fault current of the lambda sensor (18, 20, 26), and
   a cable harness belonging to the lambda sensor (18, 20, 26).

2. The method of claim 1, wherein, after the self-alignment of the lambda sensor (18, 20, 26), instead of using the pumping voltage ($U_p$) of the lambda sensor (18, 20, 26) to detect a lambda value ($\lambda$), the method includes using the pumping current ($I_p$) of the lambda sensor (18, 20, 26) corrected by the pumping current offset (32) to detect a lambda value ($\lambda$).

3. The method of claim 1, wherein the lambda sensor (18, 20, 26) is configured as a broadband lambda sensor.

4. An exhaust gas system (10) for a motor vehicle propelled by an internal combustion engine, comprising:
   a first lambda sensor (18) for detecting a first lambda value of a first motor bank (14) of an internal combustion engine (12),
   a second lambda sensor (20) for detecting a second lambda value of a second motor bank (16) of the internal combustion engine (12),
   a motor bank control system for adjusting the first motor bank (14) and the second motor bank (16) such that substantially equal lambda values are achieved for the first motor bank (14) and for the second motor bank (16),
   wherein the first and second lambda sensors (18, 20) comprise first and second self-balancing adjusters configured to:
   measure a pumping current ($I_p$) of the lambda sensors for detecting a lambda value ($\lambda$);
   measure a pumping voltage ($U_p$) of the lambda sensors correlating to the pumping current ($I_p$);
   check whether the measured pumping current ($I_p$) and the measured pumping voltage ($U_p$) lie within a specified tolerance range (33) of a characteristic curve specification for a dependence between the pumping current ($I_p$) and the pumping voltage ($U_p$); and
   when the values lie outside the tolerance range (33) of the characteristic curve specification, then adjusting the lambda value ($\lambda$) based on the pumping voltage ($U_p$) of the lambda sensor rather than based on the pumping current ($I_p$) of the lambda sensor, and, in an adjusted state, measuring a further pumping current ($I_p$) of the lambda sensor and, for the self-alignment of the lambda sensor, the pumping current offset (32) is derived from at least one of: a further pumping current ($U_p$) for a compensation of a leakage current, a fault current of the lambda sensor and a cable harness belonging to the lambda sensor.

5. The exhaust gas system (10) of claim 4, further comprising an exhaust gas catalyst (24) downstream of the first and second lambda sensors (18, 20) for chemically converting combustion pollutants and a switching-type catalyst lambda sensor (28) is provided on an output side of the exhaust gas catalyst (24).

6. The exhaust gas system (10) of claim 5, wherein the catalyst lambda sensor (28) is connected via an adjustment device to the first and second lambda sensors for self-alignment of the first and second lambda sensors as a function of a lambda adjustment intervention determined with the aid of the catalyst lambda sensor (28).

7. The exhaust gas system (10) of claim 6, wherein a pre-catalyst broadband lambda sensor (26) is provided on an input side of the exhaust gas catalyst (24), and for self-alignment of the pre-catalyst broadband lambda sensor (26), the catalyst lambda sensor (28) is connected via an adjustment device to the pre-catalyst broadband lambda sensor (26) as a function of a lambda adjustment intervention determined with the aid of the catalyst lambda sensor (28).

8. The exhaust gas system (10) of claim 6, wherein the pre-catalyst broadband lambda sensor (26) comprises a third self-alignment adjuster.

9. An exhaust gas system (10) for a motor vehicle propelled by an internal combustion engine, comprising
   an exhaust gas catalyst (24) for chemically converting combustion pollutants of an internal combustion engine (12);
   a pre-catalyst broadband lambda sensor (26) provided on an input side of the exhaust gas catalyst (24); and
   a catalyst lambda sensor (28) provided on the output side of the exhaust gas catalyst (24),
   wherein the pre-catalyst broadband lambda sensor (26) comprises a self-alignment adjuster configured to:
   measure a pumping current ($I_p$) of the lambda sensors provided for detecting a lambda value ($\lambda$);
   measure a pumping voltage ($U_p$) of the lambda sensor correlating to the pumping current ($I_p$);
   check whether the measured pumping current ($I_p$) and the measured pumping voltage ($U_p$) lie within a specified tolerance range (33) of a characteristic curve specification for a dependence between the pumping current ($I_p$) and the pumping voltage ($U_p$); and
   when the values lie outside the tolerance range (33) of the characteristic curve specification, then adjusting the lambda value ($\lambda$) based on the pumping voltage ($U_p$) of the lambda sensor rather than based on the pumping current ($I_p$) of the lambda sensor (18, 20), and, in an adjusted state, measuring a further pumping current ($I_p$) of the lambda sensor and, for the self-alignment of the lambda sensor, the pumping current offset (32) is derived from at least one of: a further pumping current ($U_p$) for a compensation of a leakage current, a fault current of the lambda sensor and a cable harness belonging to the lambda sensor.

* * * * *